Patented July 15, 1924.

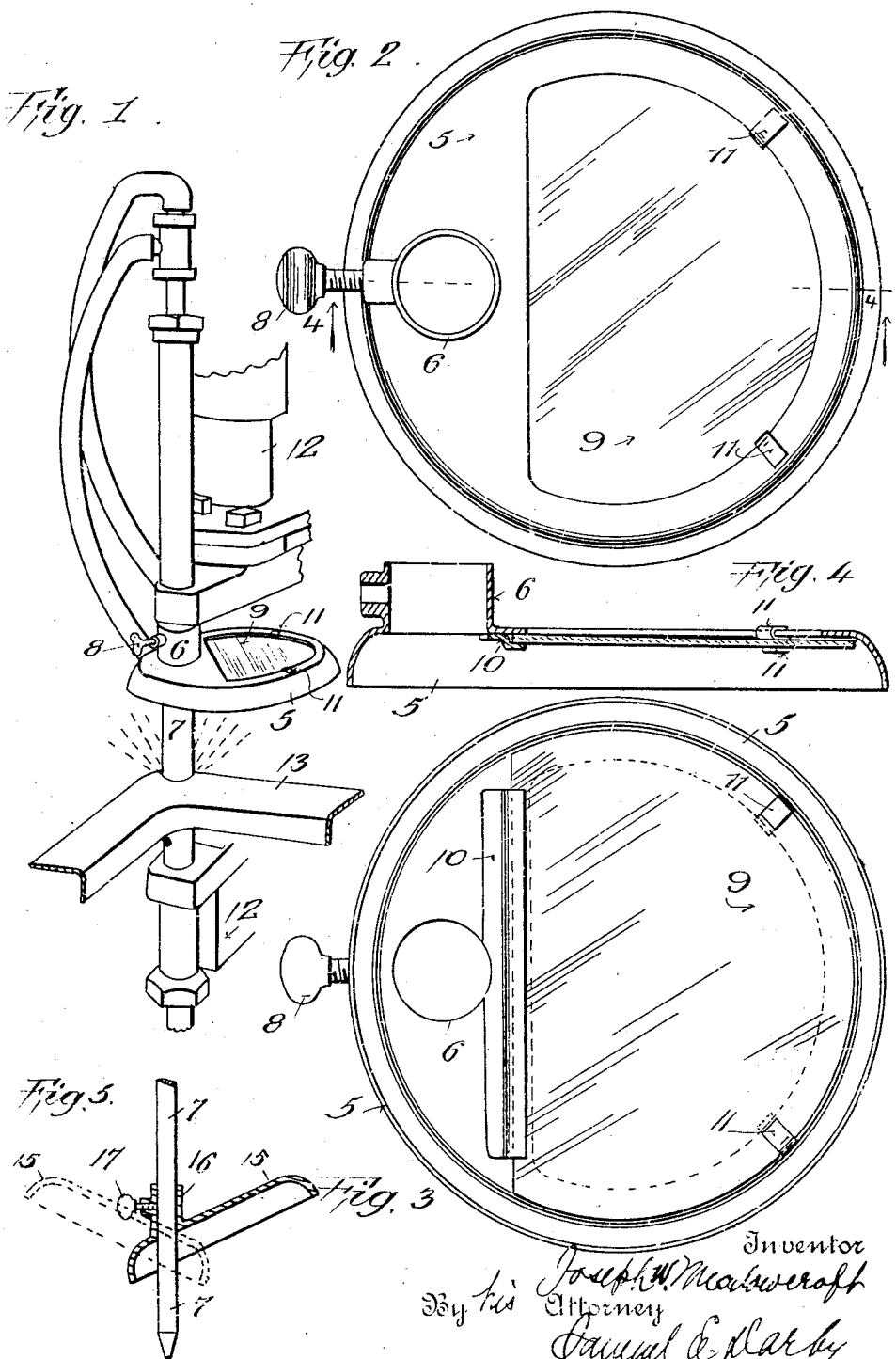

1,501,058

UNITED STATES PATENT OFFICE.

JOSEPH W. MEADOWCROFT, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

SHIELD FOR ELECTRIC-WELDING MACHINES.

Application filed April 17, 1920. Serial No. 374,668.

*To all whom it may concern:*

Be it known that I, JOSEPH W. MEADOWCROFT, a citizen of the United States, residing at Philadelphia, in the county of Philadelphia, State of Pennsylvania, have made a certain new and useful Invention in Shields for Electric-Welding Machines, of which the following is a specification.

This invention relates to shields for use in connection with electric welding machines.

The object of the invention is to provide a shield to protect the operator of an electric welding machine from the sparks which are generated and fly off during the welding operations.

A further object is to provide a shield of the nature referred to which avoids the necessity of the machine operator wearing goggles as a protection against the sparking that occurs during electric welding operations.

A further object is to provide a shield of the nature referred to which is simple in construction, economical to manufacture, and easily and quickly applied to or removed from the welding machine, and which is efficient for the purposes for which it is intended.

Other objects of the invention will appear more fully hereinafter.

The invention consists substantially in the construction, combination, location and relative arrangement of parts, all as will be more fully hereinafter set forth, as shown in the accompanying drawing, and finally pointed out in the appended claims.

In the drawing:—

Fig. 1 is a view in perspective elevation of a portion of an electric welding machine showing the application thereto of a shield embodying the principles of my invention.

Fig. 2 is a top plan view of the shield.

Fig. 3 is a bottom plan view of the same.

Fig. 4 is a sectional elevation of the same on the line 4, 4, Fig. 2. Fig. 5 is a view somewhat diagrammatic showing the mounting of the shield in an inclined position.

In the operation of electric welding machines when the electrodes are brought into welding relation with respect to the parts to be welded, sparks are generated which fly off in all directions from the welding point. This sparking has necessitated the provision of means to protect the operator from the effects of the sparks. The usual form of protector heretofore employed by welding machine operators has been a pair of goggles worn by the operator while operating the machine. This form of protector, for various reasons, is not satisfactory.

In order to afford adequate protection from the sparking, the goggles are required to cover a large area of the face and this is not only uncomfortable and inconvenient but it very materially prescribes the range of vision of the operator.

It is among the special purposes of my present invention to avoid these and other objections and to provide a shield or guard of simple structure which may be quickly, readily, and easily attached to or removed from a convenient part of the machine, and which affords protection to the operator from the sparking produced during the welding operations while, at the same time, permitting inspection to be made of the welding operation, thereby rendering the use of goggles wholly unnecessary.

In carrying out my invention I provide a circular dish shaped body 5, having means by which it may be easily and detachably mounted upon a convenient part of the welding machine. In the particular arrangement shown to which, however, my invention as defined in the claims, is not to be limited or restricted, the shield body is provided adjacent the edge thereof with a socket member 6 through which one of the electrodes 7 may pass, the shield being held in position on the electrode by means of the clamp screw 8. A segmental portion of the shield body base is cut out and the opening thus left is covered by a transparent plate 9. This plate may be retained in place on or against the base of the shield body in any suitable or convenient manner. A simple arrangement for the purpose is shown wherein a sheet metal strip 10 is secured to the base of the body and forms a pocket to receive and retain one edge portion of the plate 9. Sheet metal clips 11 fastened to the shield body serve also to engage and retain the edge of the transparent plate at other points.

The shield body is quickly and economically made by stamping the same out of sheet metal and, in practice, the dish shaped shield is applied in inverted position as clearly shown in Fig. 1.

It may sometimes be convenient and desirable to so support and mount the shield that the same may be shifted around the electrode while held in inclined relation thereto, in order to afford the operator a wider range of effective use of the shield as a protector from the flying sparks and at the same time permit the operations at the welding point to be more fully exposed to observation. Such an arrangement is shown in Fig. 5, wherein the shield 15 is disposed at an angle to the socket member 16 through which the electrode 7 passes. With this arrangement the inclined shield device 15 may be adjusted around the member 7 by simply loosening the set screw 17 and rotarily adjusting the socket 16 upon member 7, and then tightening up on the clamp screw 17.

Portions only of the welding machine are shown at 12, and the work to be welded is indicated at 13.

With a guard or shield of the nature referred to, applied, as described, to a convenient part of the machine, not only protects the operator from the effects of the sparking but it also enables the operator to view the welding operations through the transparent plate, and it dispenses with the use of goggles for purposes described.

While I have described my invention as being applied to an electric welding machine, it is obvious that the device is not limited in use to electric welding machines, as it is equally useful in connection with other machines where the operators are exposed to flying sparks or other particles in the operation thereof. My invention, therefore, is not to be limited or restricted in respect to the particular character of machine to which the device may be applied.

Having now set forth the objects and nature of my invention and a construction embodying the principles thereof, what I claim as new and useful and of my own invention, and desire to secure by Letters Patent is:—

1. A protecting shield for electric welding or other machines comprising a dish shaped body having an opening therethrough, a transparent plate forming a cover for said opening, means to secure said cover plate to said body, and means to attach said body to the machine.

2. A protecting shield for electric welding or other machines, comprising a circular body having an opening therethrough, a transparent plate forming a cover for said opening, said body having a socket member adjacent the edge thereof for detachable attachment of said body to the machine.

3. A protecting shield for electric welding or other machines comprising a dish shaped body having a segmental opening through the base thereof, a transparent cover plate for said opening, means to retain said cover plate in place, and means for attaching said body to the machine.

4. A protecting shield for electric welding or other machines comprising a flat body having a depending flange and an opening through the flat portion of said body, a transparent plate forming a cover for said opening, said body having a socket member for attachment to the machine, said body and socket member being disposed in inclined relation with respect to each other.

5. A protecting shield for electric welding or other machines comprising a body having an opening therethrough, a transparent plate forming a cover for said opening, said body having a socket member for attachment to the machine, said body and socket member being disposed in inclined relation with respect to each other, and means to shift said socket member upon the machine to vary the direction of inclination of the shield body with reference to the working point of the welding operation.

6. In a welding machine the combination with an electrode, of a shield device having a supporting member fitting upon such electrode to afford protection to the operator from flying sparks during the welding operations, said shield device being disposed at an angle with respect to said supporting member, and means to rotarily adjust said supporting member upon said electrode.

7. In an electric welding machine, the combination with a reciprocating electrode, of a shield mounted upon said electrode and provided with a transparent sight opening therethrough.

8. A protecting shield for electric welding or other machines, comprising an inverted dish-shaped body having an opening through the bottom wall thereof, a transparent cover plate for said opening, and means adjacent the edge of said body for attaching the same to the machine.

9. A protecting shield for electric welding and other machines, comprising a body having an opening therethrough, a transparent cover plate for said opening, and means adjacent the edge of said body for attaching the same to the machine.

10. A protecting shield for electric welding or other machines, comprising a body having an opening through a portion thereof, and a transparent cover plate for said opening, the said body, at one side of the opening therein, having means to attach the same to the machine.

In testimony whereof I have hereunto set my hand on this 6th day of April A. D., 1920.

JOSEPH W. MEADOWCROFT.